United States Patent

Brinkmeyer et al.

Patent Number: 5,596,317
Date of Patent: Jan. 21, 1997

[54] VEHICLE SAFETY DEVICE WITH ELECTRONICALLY CODED ACCESS AUTHORIZATION

[75] Inventors: Horst Brinkmeyer, Waiblingen; Bernd Hense, Plochingen; Michael Daiss, Filderstadt; Günter Schwegler, Weinstadt, all of Germany

[73] Assignee: Mercedes-Benz AG, Germany

[21] Appl. No.: 449,000

[22] Filed: May 24, 1995

[30] Foreign Application Priority Data

May 24, 1994 [DE] Germany .......................... 44 18 069.1

[51] Int. Cl.$^6$ .................................................. B60R 25/00
[52] U.S. Cl. ........................ 340/825.31; 340/825.34; 340/825.54; 340/825.72; 307/10.2; 180/287
[58] Field of Search .................... 340/825.31, 825.32, 340/825.69, 825.72, 825.54, 426; 307/10.2, 10.3, 10.5; 180/287

[56] References Cited

U.S. PATENT DOCUMENTS

| | | | |
|---|---|---|---|
| 5,055,701 | 10/1991 | Takeuchi | 307/10.2 |
| 5,146,215 | 9/1992 | Drori | 340/825.32 |
| 5,229,648 | 7/1993 | Sues et al. | 307/10.2 |

FOREIGN PATENT DOCUMENTS

| | | |
|---|---|---|
| 0098437 | 1/1984 | European Pat. Off. . |
| 0521547 | 1/1993 | European Pat. Off. . |

*Primary Examiner*—Edwin C. Holloway, III
*Attorney, Agent, or Firm*—Evenson, McKeown, Edwards & Lenahan P.L.L.C.

[57] ABSTRACT

In the new vehicle safety device according to the invention, random code information used to control the release of an electronic drive-away block arrangement consists of a combination of a plurality of partial information generated separately in operationally essential vehicle units which are separated from one another. The partial information is combined in a linking unit connected with these units for total random code information. Even after a code data exchange protocol has been intercepted by an unauthorized person, the latter, because of the structure of the safety device, can operate the vehicle only by replacing all of these units, which renders such unauthorized use by strangers unattractive because of the manipulations and expense required for this purpose.

6 Claims, 1 Drawing Sheet

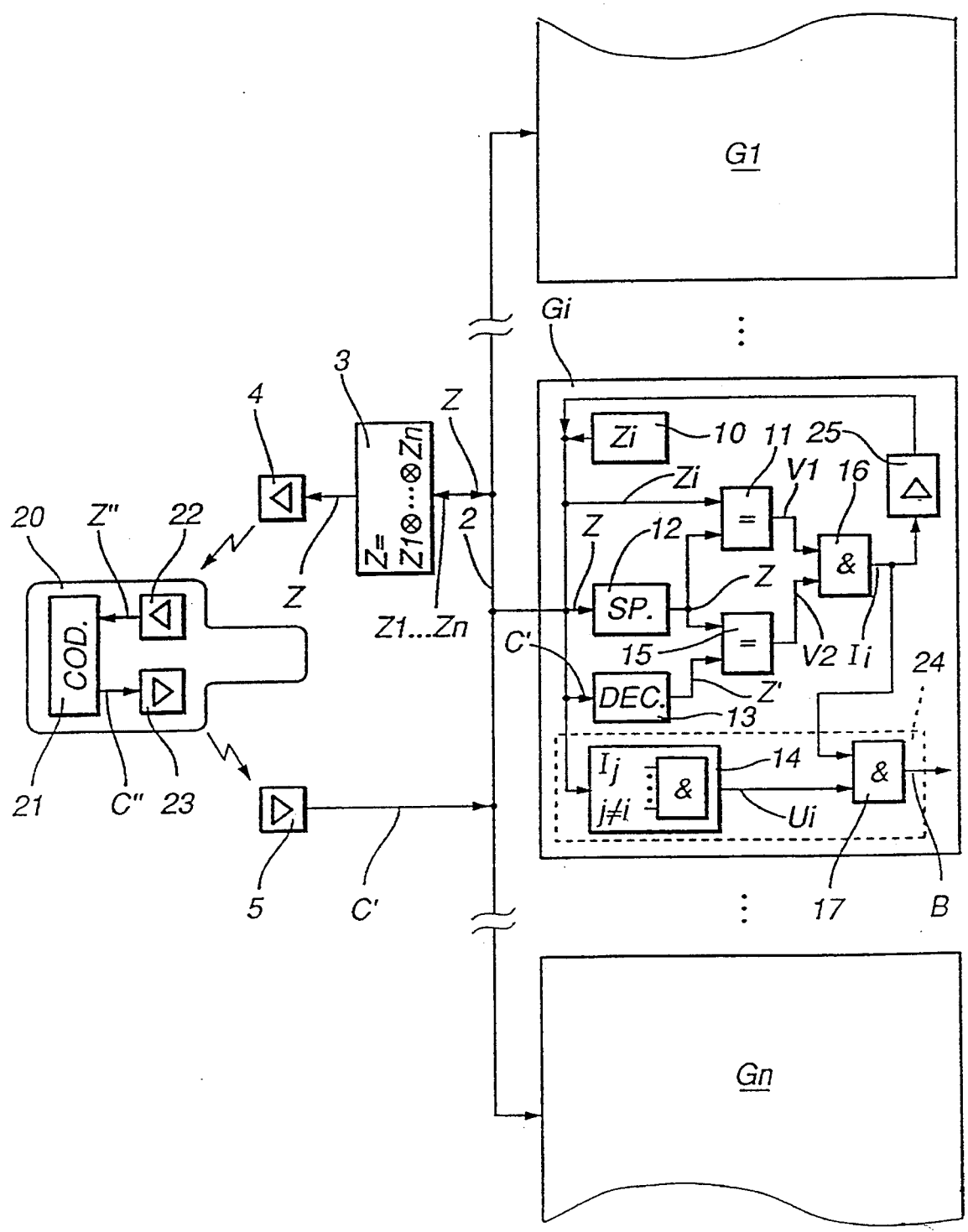

VEHICLE SAFETY DEVICE WITH ELECTRONICALLY CODED ACCESS AUTHORIZATION

BACKGROUND AND SUMMARY OF THE INVENTION

The invention relates to a safety device for a vehicle, with electronically coded access authorization for enabling a plurality of devices that are indispensable for operation of the vehicle.

Safety devices in which access authorization is tested prior to each vehicle start by sending user code information from a user unit to the vehicle, which information is evaluated in the vehicle, are known as so-called electronic drive-away blocks. Other known safety devices which utilize unidirectional information transmission (from the user to the vehicle) or bidirectional information exchange between the user and vehicle operate deterministically and/or with secret information stored in the vehicle. In contrast to such devices, the type of safety device under discussion here has the advantage that the user code information transmitted from the user unit each time depends upon random number information transmitted previously by the vehicle. This unpredictability of the next code information to be transmitted makes it impossible for an unauthorized person to operate the vehicle after intercepting one or more code transmissions or information exchange processes merely by utilizing the intercepted information, without possessing the user unit.

A safety device of this generic type is disclosed in European patent document EP 0 521 547 A1, in which a central control device on the vehicle incorporates a random code generator, transmitter and a user code evaluation unit that receives the user code information from the user unit and checks for access authorization. When access authorization is granted, it generates vehicle operation clearance information that lifts the previously activated drive-away block which keeps one or more operationally relevant devices on the vehicle inactive, in a known manner.

U.S. Pat. No. 5,146,215 teaches a safety device with unidirectional code transmission from the user key to a receiver on the vehicle, with a control unit connected thereto. In this safety device, the user key can be switched to programmed operation in which it transmits programmed information to the vehicle that causes the received code to be stored in the control unit as a valid user code. This arrangement provides a simple user key access authorization for a vehicle, or, conversely, blocks a previously valid access authorization.

European patent document EP 0 098 437 A2 teaches a key-locking safety device in which the random code information consists of random numbers. In the lock part on the vehicle a single random number generator is provided which, during an access authorization testing process, generates one or preferably several random numbers in sequence. From the one or several random numbers, encoded information is then generated in parallel in the user key and in the vehicle lock by a predetermined encoding function, which information is then transmitted optionally from key to lock or vice versa, whereupon the two items of encoding information generated in parallel are compared to see if they match.

A weak point in this known type of safety device with random code information generation performed by a single assembly on the vehicle is that an unauthorized individual can intercept, at least once, a bidirectional data communication between the legitimate user unit and the vehicle, and use the intercepted information to take possession of the vehicle at a later point in time. From the intercepted data communications protocol he can determine the access code that was used as well as the encoded response as the corresponding user code information, without knowing the encoding algorithm itself. Thereafter, the random number generating assembly can be replaced by another that is otherwise the same, but contains a fixed code memory instead of the random code generator. The intercepted random code is stored in the manipulated assembly as a fixed-code, and a false key is used in the future for the vehicle in which the corresponding intercepted user code information is stored. In this manner, the vehicle can then be operated by an unauthorized person using the duplicate electronic key thus produced.

One object of the present invention is to provide a safety device of the type recited at the outset that makes unauthorized use of the vehicle much more difficult, even after an access authorization code exchange between the legitimate user unit and the vehicle has been intercepted.

This object is achieved according to the invention by using a plurality of separate indispensable vehicle devices to generate parts of the total random code information. For this purpose, costly and/or bulky units, especially those that can only be replaced at high cost, are particularly suitable. Substitution of a fixed code generator for access code generation distributed in this manner over different vehicle systems following an interception of the type described above, would then mean replacing all of the systems involved in random code generation. Such replacement would result in a cost that was so high that it would make attempts to acquire the vehicle for unauthorized use unattractive. Further use of the vehicle, by removing these device units and not replacing them, is not possible because of their relevance to the operation-of the vehicle.

In one embodiment of the invention, in addition to distributed random code generation, provision is made for parallel evaluation of transmitted user code information in a plurality of essential vehicle systems, with the corresponding systems incorporating the decoders and comparators required for this purpose. When one of these systems has a decoder that also has a random code partial information generator, the preparation of the vehicle for unauthorized use following an interception furthermore requires the implementation of this decoding function in the replacement unit.

In another embodiment of the invention, the correctness of the random code information is verified by the individual systems used for random code information generation, with these units comparing the random code partial information they generate with the total random code information sent back to them for this purpose, so that they can make their respective contributions.

In still another embodiment of the invention at least the systems that have both a random code partial information generator and a corresponding comparator are also equipped with a user code evaluating decoder and comparison device, with the results of the comparison being logically AND/linked. The release (or failure to release) of the drive-away lock can in this case be specifically coupled to the result of the respective AND link in these vehicle systems.

In a further embodiment of the invention, all of the vehicle systems in which random code partial information comparison and/or user code checking comparison is performed are linked together for data exchange, with each of these systems transmitting its comparison result to all of the rest of these systems. In turn, in each of these systems a logical AND link of all such comparison results is provided, which makes it possible to implement the drive-away block decentrally, for example by pulling the ignition key. This ensures that all of these systems are kept inactive in the vehicle as far as their real function is concerned, with each such system being functionally active only when the comparison result is positive not only for itself, but also for all other corresponding systems. The drive-away block is thus released on the basis of the vehicle operating clearance information generated in all of these systems and simultaneously in all other systems.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing shows a block diagram of a vehicle safety device with electronically coded access authorization according to the invention.

DETAILED DESCRIPTION OF THE DRAWING

As shown in the FIGURE, the safety device according to the invention, makes use of a number n of control devices $G_1, \ldots, G_n$ (n being greater than 1), which are separate elements of the vehicle electrical system indispensable for vehicle operation. (In addition to these control devices used for the safety device, the vehicle of course can incorporate other control devices.) To explain the invention, the circuit design of an arbitrarily selected i-th control device $G_i$ is shown in more detail to the extent that it relates to functions important to the invention regarding the safety device. (The conventional function of this control device ($G_i$) for vehicle operation is not shown for the sake of simplicity.) The circuit design of all the other vehicle device units ($G_1, \ldots, G_i, G_{i+1}, \ldots, G_n$) used for the safety device corresponds to that of the i-th control device ($G_i$) to the extent that it relates to the safety device technology.

The control devices used for the safety device ($G_1, \ldots, G_n$) are connected with each other and with other units of the safety device, by a CAN-bus (2). The additional units, connected to CAN-bus (2), are a vehicle infrared signal receiver (5) and a random number partial information linking unit (3) described in greater detail below. On the other side, an infrared signal transmitter (4) mounted on the vehicle is connected to the random number partial information linking device (3).

The user part of the safety device, in the form of electronic user key (20), communicates with the abovedescribed elements bidirectionally through the vehicle transmitter (4), the vehicle receiver (5) and the corresponding infrared transmission link. Key (20) contains an encoder (21) as well as an infrared signal receiver (22) connected to the encoder on the input side, together with an infrared signal transmitter (23) connected on the output side.

In the following, the function of the safety device thus constructed will be explained by referring to the function of the individual components in detail. In the control device, for example, reference will be made to the explicitly shown circuit design of the i-th control device ($G_i$).

Without limiting generality of the invention, the parked vehicle to be operated by a user is selected by way of example, as the starting point. In this parked state of the vehicle, a drive-away block is activated, disabling the actual vehicle functions of control devices ($G_1$ to $G_n$) incorporated in a safety device. (This drive-away block may have been armed, for example, by previously pulling the ignition key out of the ignition lock.) When the user wants to drive the vehicle, the safety device is initially activated by a corresponding starting pulse (not shown) which is generated by the actuation of a vehicle unlocking key provided on an electronic key (20) with which the user operates the mechanical vehicle door lock system by remote control in conventional fashion, using an authorizing unlocking code. Alternatively, the starting pulse can be generated otherwise, for example by actuating a separate key button or automatically by inserting an electronic key (20), which simultaneously serves as the ignition key, into the ignition lock.

After activation of the safety device, the vehicle transmitter (4), sends random number information (Z) as random code information that is supplied to it by random number partial information linking unit (3). For this purpose, a random number generator (10) provided in each control device ($G_1$ to $G_n$) generates random number partial information ($Z_i$; $i=1, \ldots, n$), which is transmitted via CAN-bus (2) to the random number partial information linking unit (3). This unit links the individual random number partial information ($Z_1$ to $Z_n$) to form the random number information (Z) transmitted by the vehicle. ("Linking" in this sense means, for example, that the digitally transmitted individual partial information $Z_1$ to $Z_n$, shown as a dual numbers is arranged sequentially by bit positions; however, other methods of combining may also be used.) In order for linking unit (3) to combine all the random number information (Z), transmitter identification information, which can be evaluated by linking unit (3) is transmitted simultaneously by each random number partial information generating control unit ($G_1$ to $G_n$) with the random number partial information.

Linking unit (3) then provides the random number information (Z) thus obtained not only to connected infrared signal transmitter (4) but also to connected control devices ($G_1$ to $G_n$), which check the correctness of each control device contribution to the total random number information (Z). For this purpose, each control device ($G_1$ to $G_n$) has an intermediate memory (12), for temporary storage of the random number information (Z) delivered by linking unit (3) and a comparator (11) connected downstream. The random number information (Z) and the random number partial information ($Z_i$) previously generated by corresponding control device ($G_i$) are supplied to the comparator (11) which recognizes the partial contribution of the total random number information (Z) that is fed back and which belongs to its respective control device ($G_i$), and compares it with the random number partial information ($Z_i$) generated in the corresponding control device. The output signal (V1) from this comparator (11) is fed to AND gate (16), which performs a logical AND linking (described in greater detail below) in order to generate the respective comparison result information ($I_i$; $i=1, \ldots, n$). If there is a positive comparative result in comparator (11) (that is, a match is detected between the random number partial information ($Z_i$) generated in control device (Gi) and the corresponding contribution of the fed-back total random number information (Z)), the comparator outputs a signal (V1) at a high level (H-level). This H-level signal is necessary for AND gate (16) subsequently to generate corresponding comparison result information (Ii) at the H-level, which in turn is a prerequisite for lifting the drive-away block.

In electronic key (20), random number information (Z') transmitted from the vehicle is received by receiver (22) and passed on to encoder (21), which contains both the coding algorithm signal and the secret information of the safety device. By means of the coding algorithm, user code information (C") is generated from the received signal that contains the random number information (Z") in encoded form as well as additional code information (e.g. concerning the identity of electronic key (20)). This user code information (C") is sent from encoder (21) to transmitter (23) of electronic key (20), which transmits it to the vehicle.

User code information (C') received by the vehicle through its receiver (5) is delivered by the latter to CAN-bus (2), and thence to each of the individual control devices ($G_1$ to $G_n$), where it is fed to a decoder (13) which recovers the encoded information therefrom and checks the key identification code part to makes sure that the supply code signal was generated by an authorized key (20). If this check is positive, the control devices ($G_1$ to $G_n$) extract from the user code information (C') the random number information (Z') contained therein, and supply it to another downstream comparator (15).

The random number information (Z), which was previously transmitted by the vehicle and simultaneously retransmitted from linking unit (3) to control devices ($G_1$ to $G_n$) and stored therein on an intermediate basis in respective memory (12), is also supplied to the comparator (15). By comparing input information Z and Z' the comparator (15) determines whether the random number information (Z') transmitted by electronic key (20) and decoded by decoder (13) in fact corresponds to that which results from the encoding of the random number information (Z) transmitted by the vehicle in encoder (21) of authorized electronic key (20). The result of this comparison is fed as an output signal (V2) to the second input of AND gate (16), which outputs a signal (Ii) at the H-level when both comparator output signals (V1, V2) are at the H-level, (that is, when both comparison results indicate a match for the input information). The level of the output signal (Ii) of the AND gate (16) thus indicates, only for the respective control device ($G_i$), the presence or absence of an authorized vehicle utilization requirement.

In order to form from this control device-specific access authorization information (I1, . . . , In), vehicle operating authorization information (B) that results in the lifting or non-lifting of the drive-away block, (which is provided to each of the control devices ($G_1$ to $G_n$) involved in the drive-away block and hence in the safety device), the respective output signal (Ii) of AND gate (16) is transmitted by a transmitting unit (25) to CAN-bus (2) and from there to the other control devices. All of this device-specific comparison result information (I1 to In) is fed in each control device ($G_1$ to $G_n$) to an AND-linking stage (24) (surrounded by a broken line in the FIGURE) in control device ($G_i$), in which the information (Ij; j not equal to i) of the other control devices ($G_j$) is first logically linked in a first AND linking unit (14). The output signal (Ui) of AND gate (14) is fed to an input of a following AND gate (17), whose other input receives information (Ii) from the same control device ($G_i$). The AND gate (17) links these two input signals to generate the vehicle operating authorization information (B), that is also generated in the same fashion in each of these control devices ($G_1$ to $G_n$) by the logical AND linking of all device-specific comparison result information (I1 to In), and is then available in identical form in every control device ($G_1$ to $G_n$).

The drive-away block is removed when in each control device ($G_1$ to $G_n$) involved in the safety device, the blockage of its own vehicle operating function is lifted because the vehicle operating authorization signal (B) is at the H-level. That is, the drive-away block is lifted when both error-free formation of total random number information (Z) from the individual contributions (Zi) of the involved control devices ($G_i$), and error-free encoding and decoding of this transmitted random number information, indicating the presence of a legitimate electronic key (20), are detected in all of these control devices ($G_1$ to $G_n$). The lifting of the drive-away block by a correctly recognized access authorization takes place through the vehicle operating release signal (V) and H-level, separately but simultaneously, in all of these control devices ($G_1$ to $G_n$), since it is generated in identical fashion in all the control devices ($G_1$ to $G_n$). On the other hand, when a negative comparison result (V1) and/or (V2) (and therefore an unauthorized vehicle startup attempt) is recognized in one or more of the control devices ($G_1$ to $G_n$) involved in the safety device, this information is conducted further as a device-specific comparison result signal (Ii) at a low level (L-level), to all other control devices, and the vehicle operating authorization signal (B) in all of these control devices ($G_1$ to $G_n$) assumes the L-level. Thus, all the control devices ($G_1$ to $G_n$) remain inactive as far as their actual vehicle operation function is concerned, so that the drive-away block is completely maintained.

With the foregoing arrangement, an unauthorized person who has intercepted a one-time data code exchange between the vehicle and the electronic key (20), would have to replace all the control devices ($G_1$ to $G_n$) included in the safety device in order to operate the vehicle. If even one of these control devices is not replaced, this device would recognize the manipulation attempt each time by means of its internal comparisons. It would therefore continue to maintain the drive-away block function for the vehicle by correspondingly continuing to maintain the block in its actual vehicle operating function. Thus, because of the generation of random number information (Z) that takes place and is divided between all of these control devices ($G_1$ to $G_n$), a control device that was not replaced would immediately recognize the replacement of random number partial information linking unit (3) by a fixed code unit with intercepted random number information stored therein, by the fact that, even if such a fixed code unit did in fact possess random number information feedback, the partial information contribution belonging to this control unit would no longer match the partial information generated by random number generator (10) of this control device. In addition, all of the replacement control devices would have to be provided with the safety device related part of the circuit structure described above, since otherwise a control device that had not been replaced would recognize the absence of the comparison result information in question from the other control devices. Moreover, an unauthorized individual, for purposes of continuing to operate the vehicle using an intercepted transmission and reception protocol between electronic key and vehicle, would have to replace all of the control devices included in the safety device. However, these devices are chosen so that their replacement requires such manipulation, time, and cost as to make it unattractive. The vehicle is thus very reliably protected against use by unauthorized individuals.

It is evident from the description of the embodiment above that the individual skilled in the art could undertake further embodiments within the framework of the invention established by the attached claims. Thus, of course, instead of the random number information, other code information based on randomness could be used. Moreover, instead of the asymmetric encoding pattern described, in which a random number is generated by the vehicle, transmitted to the key, encoded there, and transmitted back to the vehicle, and then decoded in the vehicle and verified with the random number transmitted, other encoding methods are possible. For example, a symmetric encoding process can be selected in which the encoding of a random number generated by the vehicle takes place in both the vehicle and the key, and both codes are verified by the vehicle.

It is also possible, in some of the control devices, to provide only for the verification of the correctness of the encoding and decoding of the random number information, and not the generation of a device-specific random number in addition to the corresponding comparison. In such control devices, the random generator (10), the random number partial information comparing comparator (11), and the following AND gate (16) are omitted, and output signal (V2) of the remaining comparator (15) acts directly as a device-specific comparison result signal (Ii). This signal is then supplied directly to AND gate (17) and transmitting unit (25).

Similarly it is possible in some of the control devices incorporated in the safety device to provide only for verification of the correctness of the specific random number contribution, without verifying the correctness of the random number information coming from the electronic key. In this case, the decoder (13), comparator (15) connected thereto and the AND gate (16) are eliminated, and the output signal (V1) of the remaining comparator (11) is supplied as a device-specific comparison result signal (Ii) directly to transmitting unit (25) and the following AND gate (17) of AND linking stage (24).

In addition, if desired, it is also possible to link the device-specific comparison result information (I1 to In) in a single, central AND linking stage, which is then provided as an independent unit outside the control devices. The result obtained, i.e. the vehicle operation authorization information (V), is again supplied to the control devices. The analogous procedure is also possible as regards verification of the random number information coming from the electronic key, with the decoder together with the connected comparators being provided as central modules located outside the control devices, and with the signal being fed to the decoder on the input side from a receiver (5) on the vehicle side. The decoding output signal in turn is then conducted via the CAN-bus to the individual control devices.

Instead of the described use of control devices in the vehicle's electrical system, of course other vehicle assemblies important for driving operation can be used to prepare the corresponding function within the safety device. Moreover, instead of the bidirectional infrared transmission links described, other transmission media such as radio, induction, or ultrasound may be used for one of the two or for both links. Likewise, instead of the CAN-bus system described, other bus systems may be used.

It is a common feature of all the possible embodiments that electronic devices provided in a plurality of vehicle assemblies can only effect the generation of random code information in common. The code information is transmitted to an electronic key, encoded in the latter in accordance with an encoding algorithm, and transmitted back to the vehicle, where it is decoded to permit user authentication for the vehicle, with a high level of protection against unauthorized use.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a vehicle safety device with electronically encoded access authorization, having a vehicle transmitter for transmitting random code information generated by the vehicle, a user unit for receiving said transmitted random code information, generating specific user code information based on the received random code information, and transmitting the user code information, and a vehicle user code evaluating unit for receiving user code information, extracting random code information contained therein, comparing the latter with corresponding random code information generated by the vehicle, and generating vehicle operation authorizing information only when the comparison result is positive, the combination comprising:

a plurality of control devices, each having a random number generator for generating random code partial information, one such control device being arranged in and controlling operability of each of a plurality of vehicle systems whose function is required for operation of the vehicle; and a random code partial information linking device having an input coupled to receive random code partial information from each of said control devices and an output coupled to the vehicle transmitter, which linking device links said random code partial information received from each of said control devices in a predetermined manner to form said random code information transmitted by said vehicle transmitter.

2. Safety device according to claim 1 wherein:

said user code evaluating unit comprises a plurality of decoders for extracting random code information contained in user code information, one such decoder being located in a control device unit in each of said vehicle systems;

the random code information is transmitted from the random code partial information linking device to each of said systems; and each of said control devices contains a first comparator for comparing the random code information transmitted by the random code partial information linking device with the random code information extracted by the control device, means for communicating a result of said comparison to each other control device, and means for generating a vehicle operation releasing information only when a positive comparison result is achieved in all of said control devices.

3. Safety device according to claim 1 wherein:

random code information is transmitted from random code partial information linking device to said control devices; and each control device has a comparator for comparing the random code partial information produced in this control device with the random code partial information recognized from the transmitted random code information as belonging to this control device, with generation of the vehicle operation authorization information occurring only when a positive comparison result is achieved in all of these control devices.

4. Safety device according to claim 2 wherein:

each control device has a second comparator for comparing the random code partial information produced in this control device with the random code partial information recognized from the transmitted random code information as belonging to this control device, with generation of the vehicle operation authorization information occurring only with a positive comparison result in all control devices.

5. Safety device according to claim 3 wherein each control device also has a decoder for extracting random code information contained in the user code information, and an additional comparator for comparing the random code information transmitted by the random code partial information linking device with the random code information extracted by the control device, with the outputs of the comparator and the additional comparator being connected with respective inputs of an AND linking unit connected downstream.

6. Safety device according to claim 2 wherein each of said control devices has a second comparator for comparing the random code partial information produced in this control device with random code partial information recognized from the transmitted random code information as belonging to this control device, and said control devices are connected with one another for supplying comparison result information from each control device to all the other control devices, each of the control devices incorporating means for generating vehicle operation authorization information when comparison result information from all control devices indicates a positive comparison result in both of said first and second comparators.

* * * * *